United States Patent [19]

Allison

[11] 4,016,950
[45] Apr. 12, 1977

[54] SUSPENSION ARM AND JOINT ASSEMBLY

[75] Inventor: William D. Allison, Grosse Pointe Farms, Mich.

[73] Assignee: Ford Motor Company, Dearborn, Mich.

[22] Filed: July 7, 1975

[21] Appl. No.: 593,809

[52] U.S. Cl. .............................. 280/674; 280/691; 29/149.5 B
[51] Int. Cl.² ........................................ B60G 7/00
[58] Field of Search ......... 280/124 A, 96.2 A, 674, 280/691; 29/149.5 B

[56] References Cited
UNITED STATES PATENTS

| | | | |
|---|---|---|---|
| 3,195,918 | 7/1965 | Poole | 280/124 A |
| 3,273,909 | 9/1966 | Muller | 280/96.2 A |

*Primary Examiner*—Philip Goodman
*Attorney, Agent, or Firm*—Clifford L. Sadler; Keith L. Zerschling

[57] ABSTRACT

A suspension arm and joint assembly for a motor vehicle suspension system and a method for making the assembly is disclosed. The assembly is manufactured by first stamping a sheet metal suspension arm with an inner portion constructed to be pivotally connected to a vehicle chassis member and an outer portion with a recessed socket configuration. A plastically deformable element is situated within the socket and a frangible bearing is positioned adjacent the deformable element. The ball of a ball stud engages the bearing. A second frangible bearing is placed in engagement with the ball. A second socket part exerts a force against the bearings during the assembly of the joint and causes each bearing to fracture into circumferentially spaced bearing pieces. The second socket part is secured to the suspension arm stamping while retaining the load upon the bearings whereby the ball and socket joint thus formed is preloaded. The initial preload exceeds the desired amount which amount is achieved by exerting an axial load upon the ball stud causing the deformable element to deform and thereby relieving the excess preload.

10 Claims, 5 Drawing Figures

U.S. Patent  April 12, 1977  4,016,950
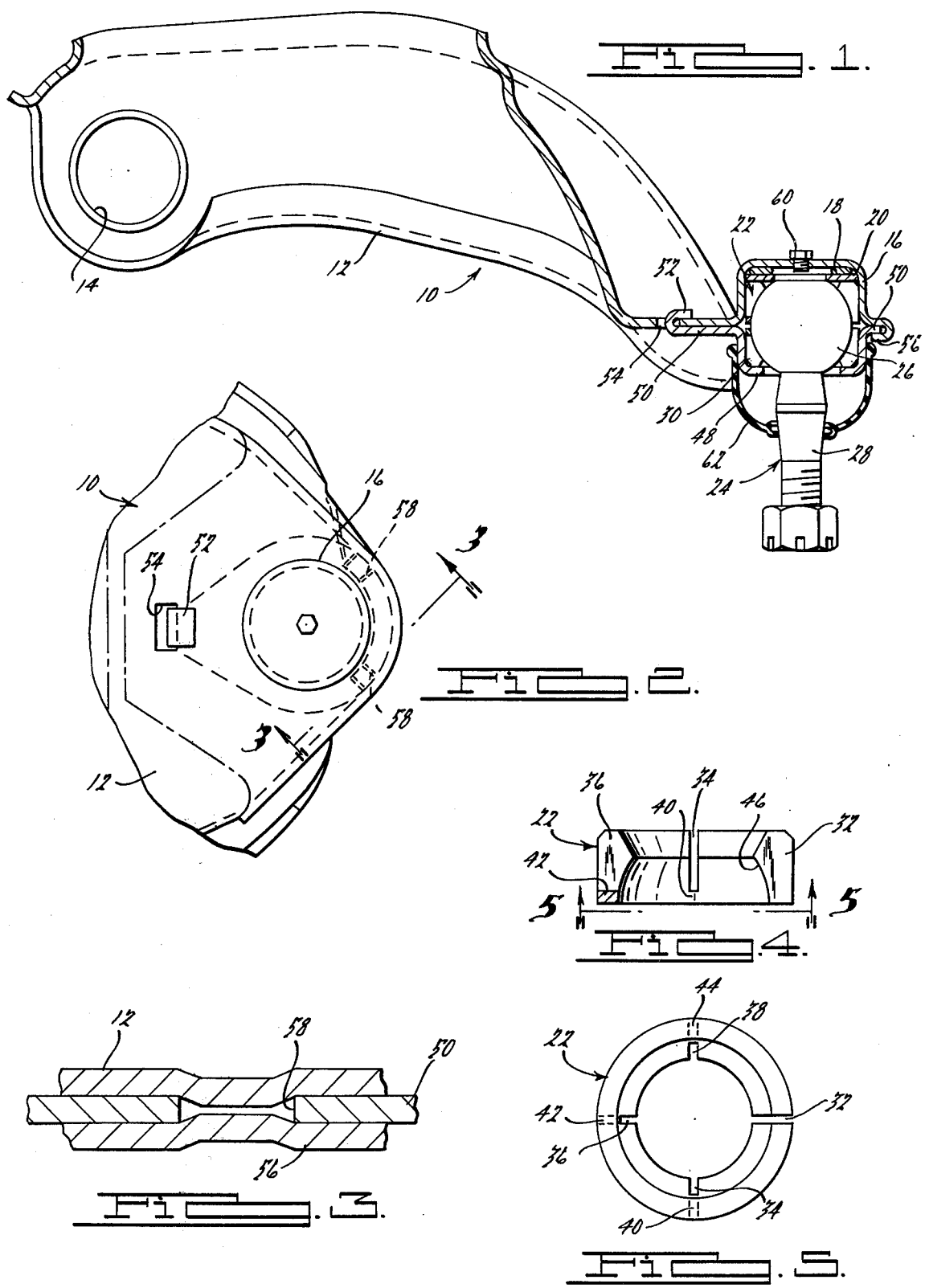

SUSPENSION ARM AND JOINT ASSEMBLY

BACKGROUND OF THE DISCLOSURE

The subject matter of the disclosure of this patent relates, in a general way, to the subject matter of the disclosures of U.S. patent applications Ser. No. 593,808 for "Preloaded Tie Rod End Assembly" and Ser. No. 593,810 for "Tie Rod End," both filed July 7, 1975 by W. D. Allison, the patentee hereof.

In order to provide a suspension arm and joint assembly for a motor vehicle that operates in an optimum manner, it is necessary to have such an assembly with frictional resistance to joint movement that is within a prescribed operating range. Frictional resistance in the joint that is either above or below the desired range may exhibit undesirable effects. While the suspension will function for its intended purpose of permitting jounce and rebound movement of the chassis, the vehicle operator may find that the ride and handling qualities or "feel" of the vehicle are less than might be desired.

The present invention provides a suspension arm and joint assembly that is characterized by its unique construction and method of manufacture which permits precise control of the preload of the suspension joint while being relatively inexpensive to fabricate.

BRIEF AND SUMMARY OF THE DISCLOSURE

In the presently preferred form of a suspension arm suspension joint assembly according to this invention, a stamped sheet metal suspension arm has structure at its inner end for pivotally connecting the arm to a vehicle chassis. A first socket part is integrally formed at the outer end of the arm. A plastically deformable lead washer is fitted in the first socket. First and second frangible bearings are positioned in engagement with the ball of a ball stud and these three pieces are inserted into the first socket part. A second socket part engages the second bearing and, while being secured to the periphery of the first socket part of the suspension arm by a crimping operation, exerts a load upon the bearings causing each to fracture into a plurality of circumferentially spaced apart bearing pieces.

At this point in the manufacturing operation, the joint has a preload that exceeds a predetermined desired amount. Next, an axial force is exerted on the ball stud that is transmitted to the deformable element causing it to plastically deform. This deformation relieves a portion of the preload of the joint. The deformable element is deformed by an amount necessary to bring the frictional resistance to rotation of the ball stud within the predetermined torque range.

BRIEF DESCRIPTION OF THE DRAWINGS

The many objects and advantages of a suspension arm and suspension joint assembly that is made according to this invention will become apparent upon consideration of the following detailed discussion and the accompanying drawings. in which:

FIG. 1 is a side elevational view, partly in section, of a suspension arm and joint assembly for a motor vehicle suspension system;

FIG. 2 is a top plan view of the outer end of the suspension arm and joint of FIG. 1;

FIG. 3 is a sectional view taken along section line 3—3 of FIG. 2;

FIG. 4 is a vertical sectional view of one of the bearings of the joint; and

FIG. 5 is a bottom plan view of the bearing taken in the direction of arrows 5—5 of FIG. 4.

DETAILED DESCRIPTION OF THE PREFERRED EMBODIMENT

Referring now to the drawings, wherein the presently preferred embodiment of this invention is illustrated, FIG. 1 shows the construction of a suspension arm and joint assembly 10 suitable for use in the independent front suspension system of a motor vehicle. The assembly 10 comprises stamped sheet metal arm 12 having pivot holes 14 at its inner end for pivotally connecting the arm and joint assembly 10 to a vehicle chassis frame. An upper socket part 16 is integrally formed in the arm 12 and opens downwardly. Positioned within the socket 16 is a plastically deformable lead washer 18 and a hard steel washer 20.

A generally annular upper bearing 22 formed of powdered bronze is positioned against the washer 20. A ball stud 24 has a ball 26 at its upper end positioned against the bearing 22. The shank 28 of the stud 24 extends downwardly from the socket 16. A second generally annular bearing 30 is positioned about the shank 28 and against the ball 26.

Bearings 22 and 30 are of identical construction. Referring to FIGS. 4 and 5, bearing 22 is generally annular and divided into four segments by slots 32, 34, 36 and 38. Slot 32 extends completely through the bearing while slots 32, 34, 36 and 38 extend only partially through the bearing material. Tie bars 40, 42 and 44 remain at the slots 34, 36 and 38 to hold the bearing segments together.

The exterior surface of the bearing 22 is generally cylindrical to complement the interior of the upper socket part 16. The interior bearing surface 46 of the bearing 22 is partially spherical to complement the exterior surface of the ball 26 of the ball stud 24.

The bearing 22 is molded of powdered bronze and is frangible. The tie bars 40, 42 and 44 holding the bearing segments together are easily fractured under load as will become evident during the following discussion.

A lower socket part 48 has a central opening and is designed to fit over the ball stud shank 28. The socket part 48 engages the upper socket part 16 to form a complete socket for retaining the bearings 22 and 30. The upper socket 16 stamped in the arm 12 has a generally cylindrical internal wall as does the interior of the lower socket part 48 to accommodate the upper bearing 22 and lower bearing 30, respectively. The lower socket part 48 has a horizontal peripheral flange 50 that rests upon flat horizontal surfaces of the suspension arm 12 adjacent the upper socket 16. The flange 50 has a tab 52 that extends through a hole 54 formed in the arm 12 inwardly of the socket part 16. The tab 52 extends through the hole 54 and is crimped over to lock it in place.

The outer edge 56 of the arm 12 extends over the peripheral flange 50 of the lower socket part 48 and is crimped over to lock the lower socket to the arm. A pair of notches 58 are formed in the flange 50 of the socket part 48 so that when the edge 56 of the arm is crimped, an interlocking structure is formed as shown in FIG. 3 which will resist accidental dislocation of the lower socket part 48.

The suspension arm and joint assembly 10 includes a machine screw 60 that is fitted in a threaded opening in the upper socket part 16. The screw 60 may be removed to provide access to the interior of the joint for the purpose of injecting lubricant. A boot seal 62 has one end in sealed engagement with the lower socket part 48 and its other end in sealed engagement with the shank 28 of the ball stud 24. The boot seal 62 prevents the entry of contaminants into the interior of the assembly where they might abrade the bearing surfaces.

METHOD OF MANUFACTURE

The suspension arm and joint assembly 10 is manufactured by first stamping the arm 12 to have the configuration as shown in the drawings. The lead washer 18 and steel washer 20 are positioned at the base of the integral socket part 16. The bearing 22 is placed on the steel washer 20. The ball end 26 of the stud 24 is placed in engagement with the bearing surface 46 of the bearing 22 and then the lower bearing 30 is slipped over the shank 28 and into engagement with the ball 26. The lower socket part 48 is positioned over the bearing 30 with its flange 50 in engagement with the arm 12. The tab 52 of the socket part 48 and the arm peripheral edge 56 are crimped over to lock the lower socket part 48 to the arm 12.

The securing of the lower socket part 48 to the arm 12 will exert a load on the bearings 22 and 30 which will cause the tie bars connecting the bearing segments to fracture whereby the bearings 22 and 30 will each become a series of circumferentially spaced apart bearing pieces. The bearing pieces align themselves with respect to the upper and lower socket parts 16 and 48 and the ball 26. Due to this self-aligning feature, close tolerance control of these parts is not required.

The crimping of the tab 52 and of the arm edge 56, in addition to fracturing the bearings 22 and 30, will impose a preload that exceeds the amount desired for the finished suspension joint. That is, the force required to overcome the frictional resistance to rotation of the stud 24 about its own axis or to pivot the stud about the center of the ball 26 will be greater than a desired predetermined amount.

In order to establish the desired joint preload, an axial force in the upward direction is exerted on the stud 24. The load imposed on the stud 24 is sufficiently great to cause the plastic deformation of the lead washer 18. The axial load is applied in increments and the frictional resistance to rotation of the ball stud 24 is noted between each load application. Plastic deformation of the washer 18 will relieve the preload of the joint and the axial force is applied to the stud 24 to the extent necessary to bring the frictional resistance to rotation of the stud into the desired torque range.

SUMMARY

The suspension arm and joint assembly of this invention is characterized by its simplicity of construction and ease of manufacture. The method by which the preload is established assures that the finished joint will have frictional resistance to movement within the desired specified range. The segmented bearings fracture into self-aligning bearing elements on assembly and close tolerance control on the upper or lower housing parts or upon the ball diameter is not required.

The foregoing description presents the presently preferred embodiment of this invention. Modifications and alterations may occur to those skilled in the art that will come within the scope and spirit of the following claims.

I claim:
1. A suspension arm and joint assembly comprising:
a stamped sheet metal suspension arm having pivot structure at its inner end constructed to be pivotally connected to a vehicle chassis;
said suspension arm having an integral first socket part spaced from said pivot structure;
a first bearing means positioned in said first socket part;
said first bearing means having a plurality of circumferentially spaced apart bearing elements;
a ball stud having a ball portion in slidable engagement with said circumferentially spaced apart bearing elements of said first bearing means and a shank portion extending in a direction away from said first socket part;
a second bearing means having a plurality of circumferentially spaced apart bearing elements in slidable engagement with said ball;
said first bearing means being disposed on one side of the equator of said ball portion and said second bearing means being disposed on the other side of the equator of said ball portion;
a second socket part engaging said second bearing means;
means securing said socket part to said suspension arm;
said first and second socket parts cooperating to provide an enclosure for said first and second bearing means and said ball portion of said ball stud.
2. A suspension arm and joint assembly according to claim 1 and including:
said first and second bearing means each having a generally annular configuration.
3. A suspension arm and joint assembly according to claim 1 and including:
a plastically deformable element situated within one of said socket parts;
means constructed to transfer a load of sufficient magnitude to deform said deformable element from said ball stud to said deformable element.
4. A suspension arm and joint assembly comprising:
a stamped sheet metal suspension arm having pivot structure at its inner end constructed to be pivotally connected to a vehicle chassis;
said suspension arm having an integral first socket part spaced from said pivot structure;
a first bearing means having a plurality of circumferentially spaced apart bearing elements positioned in said first socket part;
a ball stud having a ball seated in engagement with said first bearing means and a shank extending from said first socket part;
a second bearing means having a plurality of circumferentially spaced apart bearing elements in engagement with said ball;
a second socket part enclosing said second bearing means;
means securing said socket part to said suspension arm;
a plastically deformable element situated in said socket parts;
means constructed to transfer a load of sufficient magnitude to deform said deformable element from said ball stud to said deformable element;
said plastically deformable element having a thickness in said assembly that is less than its thickness prior to placement in said assembly.

5. A suspension arm and joint assembly comprising:
a suspension arm having pivot structure at its inner end constructed to be pivotally connected to a vehicle chassis;
said suspension arm having an integral first socket part formed at its outer end;
a plastically deformable lead washer situated at the base of said first socket part;
first bearing means having a plurality of circumferentially spaced apart bearing elements positioned in said first socket part;
load transfer means interposed between said first bearing means and said washer;
a ball stud having a ball seated in engagement with said first bearing means and a shank extending from said first socket part;
a generally annular second bearing means having a plurality of circumferentially spaced apart bearing elements in engagement with said ball;
a second socket part having a recessed portion enclosing said second bearing means;
said second socket part being in engagement with said arm;
said first socket part and said second socket part each having laterally extending flange portions;
crimp means securing said flange portions together.

6. A method of making a preloaded suspension arm and joint assembly comprising:
forming a suspension arm with inner pivot structure and an integral first socket part spaced from said inner pivot structure;
assembling a bearing means, a ball stud and a deformable element between said first socket part and a second socket part;
securing said second socket part to said suspension arm while maintaining a compressive load on said bearing means that exceeds a predetermined minimum amount;
exerting an axial load on said ball stud causing said deformable element to deform whereby the frictional preload resistance to rotation of said ball stud is reduced;
deforming said deformable element by an amount that provides a frictional preload resistance to rotation of said ball stud that is within a prescribed torque range.

7. A method of making a preloaded suspension arm and joint assembly according to claim 6 and including:
securing said second socket part to said suspension arm by crimping portions of said second socket part and said suspension arm in interlocking engagement.

8. A method of making a preloaded suspension arm and joint assembly comprising:
forming a suspension arm having an inner pivot structure and an integral first socket part;
assembling a frangible one-piece bearing and the ball of a ball stud between said first socket part and a second socket part;
exerting a force on said frangible bearing causing it to fracture into a plurality of bearing elements;
securing said second socket part to said suspension arm.

9. A method of making a preloaded suspension joint and arm assembly comprising:
forming a suspension arm having an inner pivot structure and an integral first socket part;
assembling a first frangible bearing means; the ball of a ball stud and a second frangible bearing means between said first socket part and a second socket part;
exerting a load on said first and second frangible bearing means causing each of them to fracture into a plurality of bearing elements;
securing said second socket part to said suspension arm while maintaining said load on said first and second bearing means.

10. A method of making a preloaded suspension joint and arm assembly comprising:
forming a suspension arm having an inner pivot structure and an integral first socket part;
assembling a first one-piece frangible bearing, the ball of a ball stud, a second one-piece frangible bearing, and a plastically deformable element between said first socket part and a second socket part;
exerting a load on said first and second frangible bearings causing each to fracture into a plurality of bearing elements;
securing said second part to said suspension arm by crimping while maintaining said load on said first and second bearings whereby the frictional resistance to rotation of said ball stud exceeds a predetermined minimum;
exerting an axial load on said ball stud causing said deformable element to deform whereby the frictional resistance to rotation of said ball stud is reduced;
deforming said deformable element by an amount that provides a frictional resistance to rotation of said ball stud that is within a prescribed torque range.

* * * * *